US 9,113,552 B2

(12) United States Patent
Martinez

(10) Patent No.: US 9,113,552 B2
(45) Date of Patent: Aug. 18, 2015

(54) CONTROL BOX MOUNTING BRACKET

(71) Applicant: Related Visual Services, Inc., Aurora, CO (US)

(72) Inventor: Ramon C.T. Martinez, Aurora, CO (US)

(73) Assignee: Related Visual Services, Inc., Aurora, CO (US)

( * ) Notice: Subject to any disclaimer, the term of this patent is extended or adjusted under 35 U.S.C. 154(b) by 229 days.

(21) Appl. No.: 13/804,695

(22) Filed: Mar. 14, 2013

(65) Prior Publication Data

US 2014/0268511 A1   Sep. 18, 2014

(51) Int. Cl.
| H04N 5/645 | (2006.01) |
| H05K 5/02 | (2006.01) |
| G09G 3/296 | (2013.01) |
| F16M 13/02 | (2006.01) |

(52) U.S. Cl.
CPC ............. *H05K 5/02* (2013.01); *F16M 13/02* (2013.01); *G09G 3/296* (2013.01)

(58) Field of Classification Search
CPC ....... F16M 11/10; F16M 11/04; F16M 13/02; H04N 5/645
USPC ............. 248/220.21, 220.22, 274.1, 276.1, 248/309.1, 317, 323, 917, 918, 919; 348/825; 361/679.01, 679.02, 825
See application file for complete search history.

(56) References Cited

U.S. PATENT DOCUMENTS

| D581,914 S | * | 12/2008 | Bures et al. | D14/239 |
| D595,277 S | * | 6/2009 | Bremmon et al. | D14/239 |
| D598,025 S | * | 8/2009 | Lau et al. | D14/452 |
| 8,125,577 B2 | * | 2/2012 | Lee et al. | 348/836 |
| 2007/0252919 A1 | * | 11/2007 | McGreevy | 348/825 |
| 2008/0236015 A1 | | 10/2008 | Fleming | |
| 2013/0135842 A1 | * | 5/2013 | Kuan | 361/825 |
| 2014/0340587 A1 | * | 11/2014 | Ejiri | 348/794 |

FOREIGN PATENT DOCUMENTS

WO    03/071645    8/2003

* cited by examiner

*Primary Examiner* — Todd M Epps
(74) *Attorney, Agent, or Firm* — Trenner Law Firm, LLC; Mark D. Trenner

(57) ABSTRACT

A bracket configured to mount a control box to a television mount used to carry a television. An example bracket may have a bracket plate, a bracing element, and attachment elements. The bracing element is attached to a back side of the bracket plate, and the bracing element is attachable to the television mount. A first attachment element is mounted to a front side of the bracket plate, and the first attachment member and the bracket plate together define a receiving channel in which to receive a first portion of the control box. A second attachment element includes a mounting strap connected to the bracket plate and/or the first attachment element, with the mounting strap being capable of fixedly mounting a second portion of the control box relative to the bracket.

20 Claims, 8 Drawing Sheets

CONTROL BOX MOUNTING BRACKET

BACKGROUND

It has long been known to mount televisions (TVs) to a wall using a bracket and/or metal arm. Such is especially true now with the advent of flat screen TVs that are lighter and less cumbersome than heavier prior generation TVs. At the same time, the use of accordant control boxes, such as cable or satellite feed controllers, disk players (e.g., Digital Video Disks (DVDs), Blu-Ray disks), and digital video recorders (DVRs), has also become more common place.

A problem arises when trying to incorporate both a wall or ceiling mounted TV and one or more control boxes. Typically, the control box(es) would be located on a shelving unit or other location, thus possibly requiring long wiring/cord extensions in order to reach the TV, especially if that TV were to be ceiling-mounted. Such long wiring extensions are not aesthetically pleasing and may create a safety issue (e.g., trip/tangle hazard).

DETAILED DESCRIPTION

Providing control boxes separate from the TV can be undesirable for a clean looking installation. The example control box mounting brackets described herein enable co-locating a TV and the one or more control units. In an example, both the TV and control unit(s) are carried by the same wall or ceiling mounting system provided for mounting the TV, such that the control units may be placed out of the TV viewing area. As such, the control units and the related wiring/cords may be generally kept out of sight without having to use wire hiders or run the cabling through the wall or ceiling.

An example bracket is configured for mounting a control box to a television mount, and the television mount is further used to carry a television (or "TV"). The bracket generally includes a bracket plate, at least one bracing element, a first attachment element, and a second attachment element. A bracing element is attached to a back side of the bracket plate, and the bracing element is attachable to the television mount. The first attachment element may be mounted to a front side of the bracket plate, and the first attachment member and the bracket plate together define a receiving channel in which to receive a first portion of the control box. The second attachment element may have a mounting strap connected to the bracket plate and/or the first attachment element, with the mounting strap being capable of fixedly mounting a second portion of the control box relative to the bracket.

Before continuing, it is noted that as used herein, the terms "include," "includes," and "including" mean, but are not limited to, "includes" or "including" and "includes at least" or "including at least." The term "based on" means "based on" and "based at least in part on."

Figure 1:
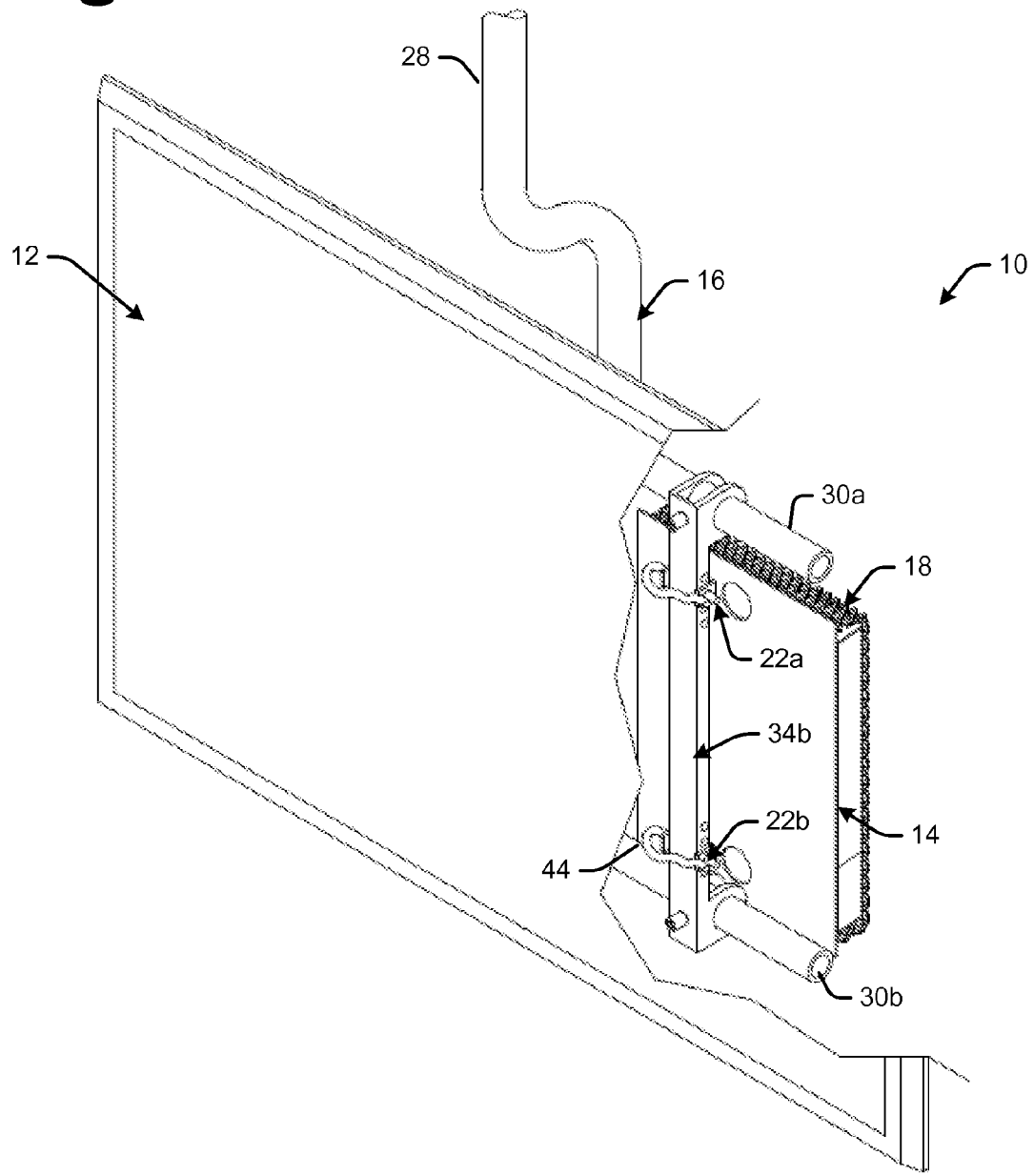
FIG. 1 is a front, partial cut-away view of an example mount system for mounting both a television and a related control box.
Figure 2:
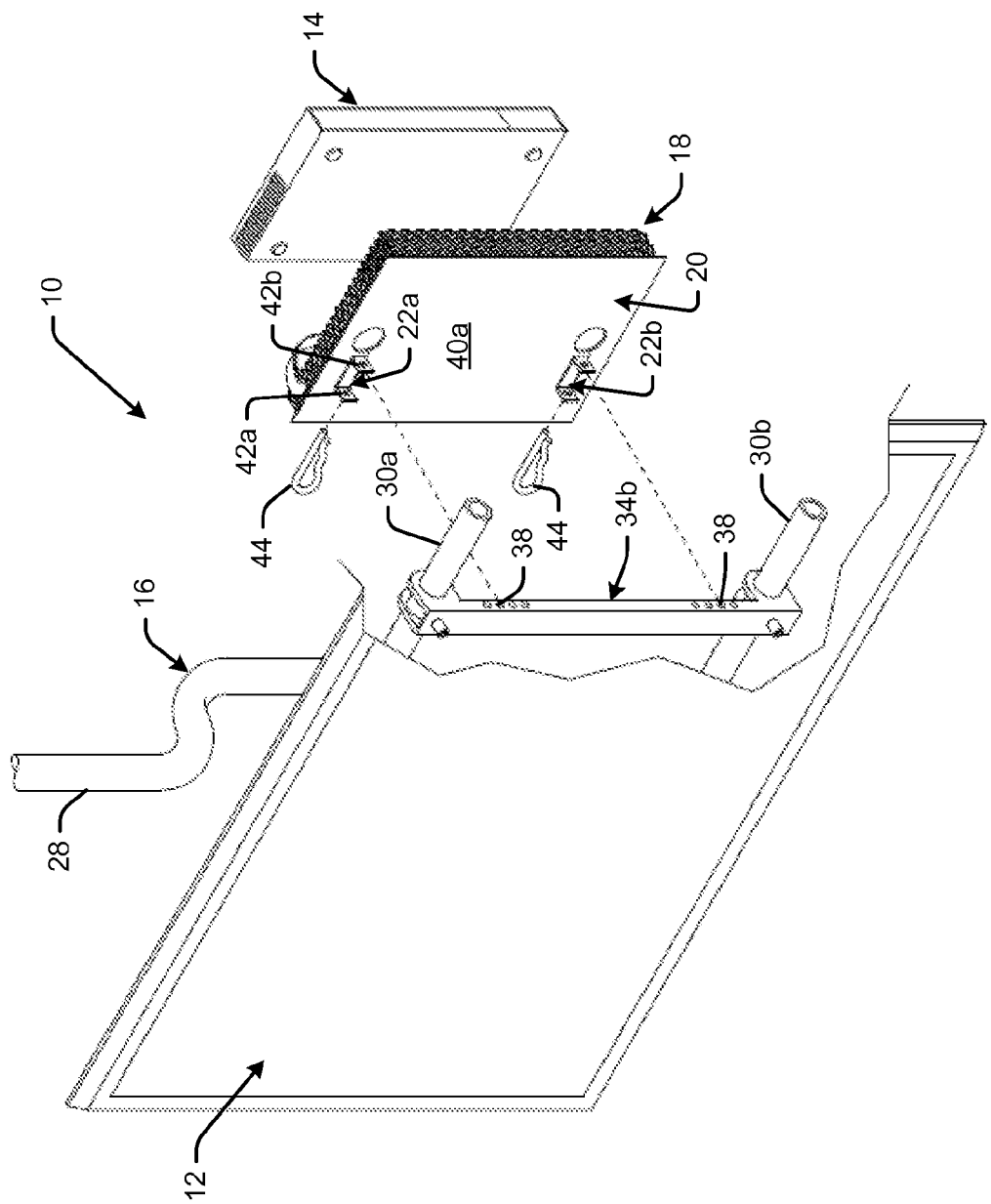
FIG. 2 is a front, partial cut-away, partially exploded view of the example mount system of FIG. 1.

FIGS. 1 and 2 are illustrations of an example mount system 10 for mounting both a television (also known herein as a TV) 12 and a control box 14 to a television mount 16. A control box bracket 18 may be used to facilitate the attachment of the control box 14 to the television mount 16.

In this example, the television 12 is illustrated as a flat-screen TV (e.g., LCD, LED, plasma, field emission, or another thin film display), but it is also be possible to employ other electronic devices with adjustments to the mount 16. Such modifications would be well within the purview of one of ordinary skill in the art after becoming familiar with the teachings herein. Additionally, the control box 14 is configured to be electrically connected to the television 12, and thereby be able to be used to control the output (both video and sound) displayed by the television 12.

The control box 14, by means of non-limiting example only, may be a cable box, a satellite receiver, a digital video recorder (DVR), a digital video disk (DVD) player, a Blu-Ray digital disk player, a gaming station (e.g., Wii, XBox 360), or a VHS tape player.

The television mount 16 illustrated, noting its vertical orientation, is used for mounting to a ceiling. However, the use of a television mount configured for a wall mounting, or even a table top mount or other configuration, are also considered within the purview of present disclosure. It is further noted that the television 12, the control box 14, and the television mount 16 (e.g., both ceiling and wall-mount versions) are commercially available in a variety of different sizes and configurations.

Figure 3:
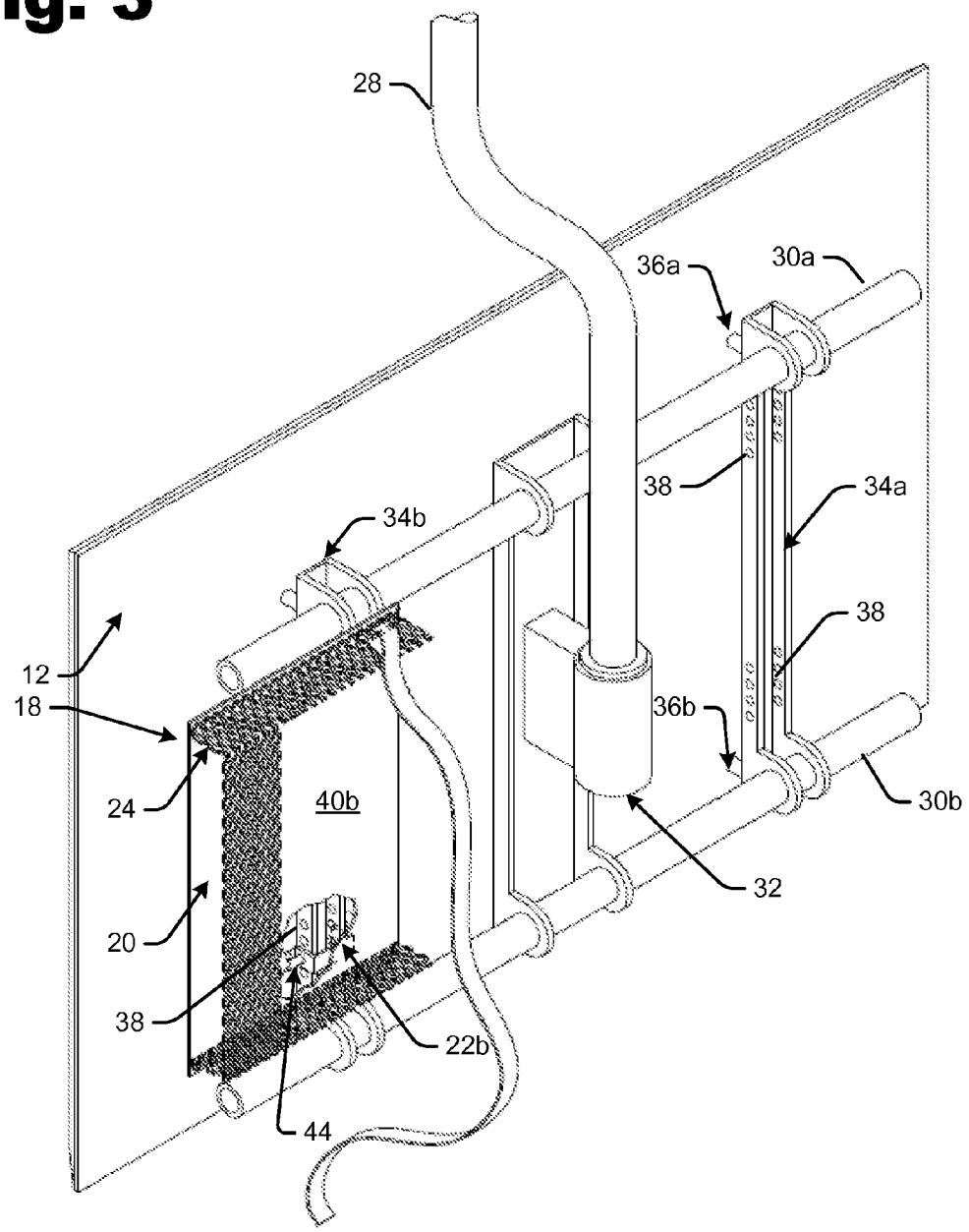
FIG. 3 is a back, isometric view of the example mount system of FIG. 1, with a partial cut-away section.
Figure 4:
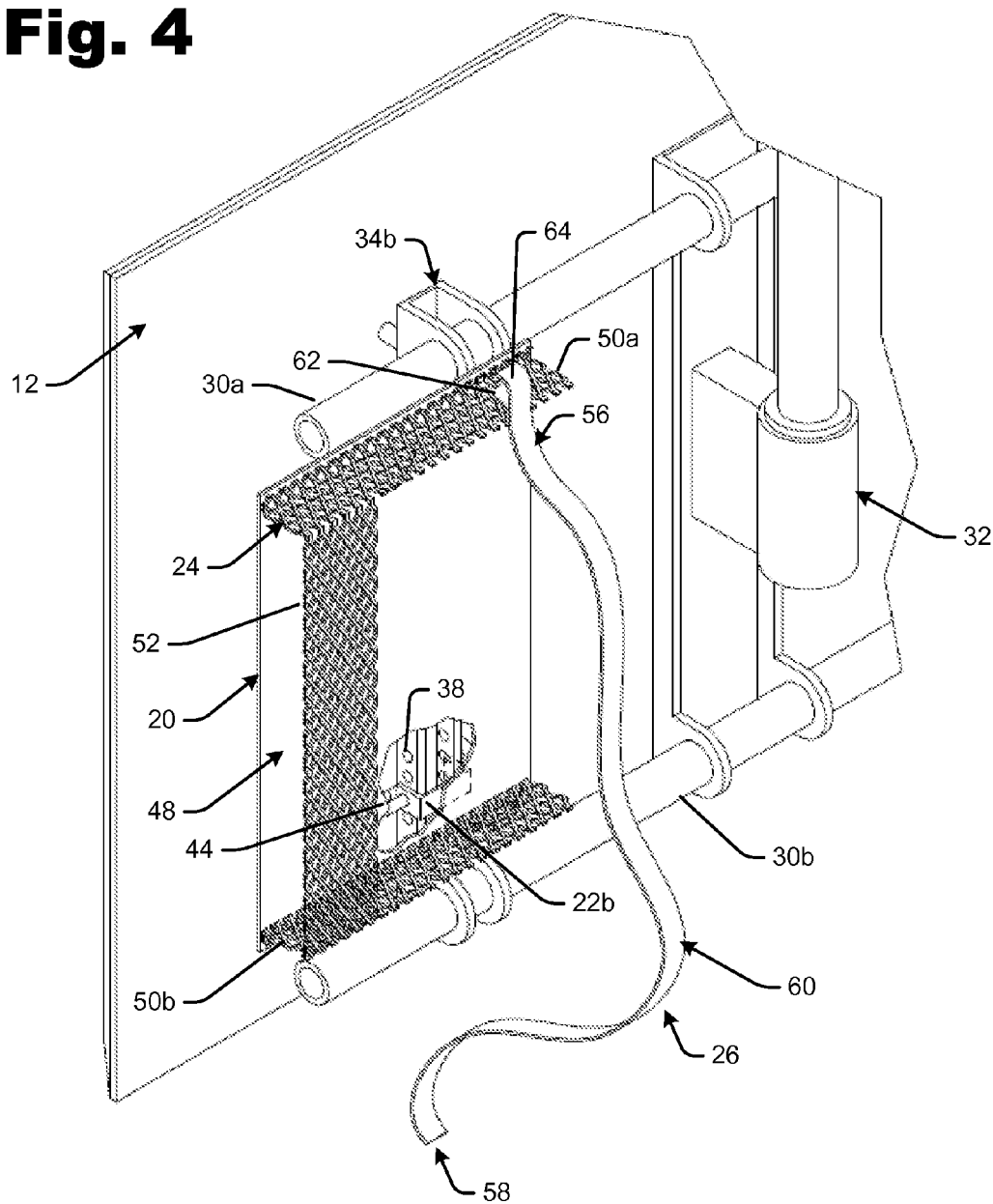
FIG. 4 is a partial magnified view of the example mount system as shown in FIG. 3.

FIGS. 3 and 4, along with FIGS. 1 and 2, illustrate example features of the control box bracket 18, with FIG. 3 providing a back view of the mount system 10, and FIG. 4 magnifying the features shown in FIG. 3. The control box bracket 18 is configured for receiving and mounting the control box 14 to a television mount 16 at a location proximate, yet behind the television 12.

In this example, the control box bracket 18 generally includes a bracket plate 20, at least one bracing element 22 (of which two such elements 22a and 22b are shown for purposes of illustration), a first attachment element 24, and a second attachment element 26. It is noted that more than one control box bracket 18, although not expressly illustrated, may also be provided to allow the mounting of multiple control boxes 14 proximate to (i.e., co-located with) the television 12, while not interfering with the viewing thereof. In addition, the bracket itself may be configured to hold more than one control box. Such holds true for any of the various embodiments of the bracket (i.e., more than one bracket may be employed and/or the bracket may be configured to hold more than one control boxes).

As seen in FIGS. 1-3, the illustrated television mount 16 generally includes an extension arm 28, first and second cross bars 30a-b, a central pivot mount 32, and carrier elements 34a-b. The features of the television mount 16 are not described in depth, except as needed in context of describing the mounting of a control box 14 via the control box bracket 18.

The extension arm 28, while not expressly shown, facilitates the attachment of the television mount 16 and, by extension, the television 12 to the ceiling or wall of a room. The extension arm 28 may be pivotally connected with the central pivot mount 32, which permits adjustment of the viewing angle of the television 12. The central pivot mount 32 is further connected to the carrier elements 34a-b via the first and second cross bars 30a-b.

The carrier elements 34a-b may be respectively provided with substantially opposed TV mounting pins 36a-b, and such TV mounting pins 36a-b facilitate the attachment of the television 12 to the television mount 16. The carrier elements 34a-b, whether supplied by the manufacturer or the end-user, are further provided with one or more control box bracket attachment holes 38, the use of which is described below.

The bracket plate 20 is shown having first and second plate sides 40a-b. The first plate side 40a faces the television mount 16 and the television 12, once the TV is mounted in place. Meanwhile, the second plate side 40b is the face adjacent which a control box 14 is located. The bracing elements 22a-b are each mounted on the first plate side 40a of the bracket plate.

While the bracing elements 22a-b illustrated are metallurgically attached (e.g., brazed, welded, soldered), it is noted that such elements may, additionally or alternatively, be mechanically attached (e.g., threadedly fastened, riveted, etc.).

The bracing elements 22a-b each respectively define therein pin receiver holes 42a-b. Such pin receiver holes 42a-b can be matched or otherwise mated with concordant control box bracket attachment holes 38 within the carrier element 34b. A connector pin 44 is inserted through the adjoining control box bracket attachment holes 38 and pin receiver holes 42 a-b, thereby attaching a bracing element 22a-b and, thus, the control box bracket 18 to the television mount 16. While the connector pins 44 are illustrated as linchpins or cotter pins, it is noted that a bolt and nut combination or other connector may also be used and still be within the definition of a connector "pin" in this context.

In an example, the first attachment element 24 is mounted to the second plate side 40b of the bracket plate 20. The control box 14 may generally be considered to define first and second box portions 46 a-b. The first box portion 46a is inserted into and received by a receiving channel 48 defined by the bracket plate 20, functioning in conjunction with the first attachment element 24. The first attachment element 24, in the version illustrated in FIGS. 2-4, may include opposed edge members 50 a-b and a support member 52 connectively extending between the opposed edge members 46a-b.

Figure 5:
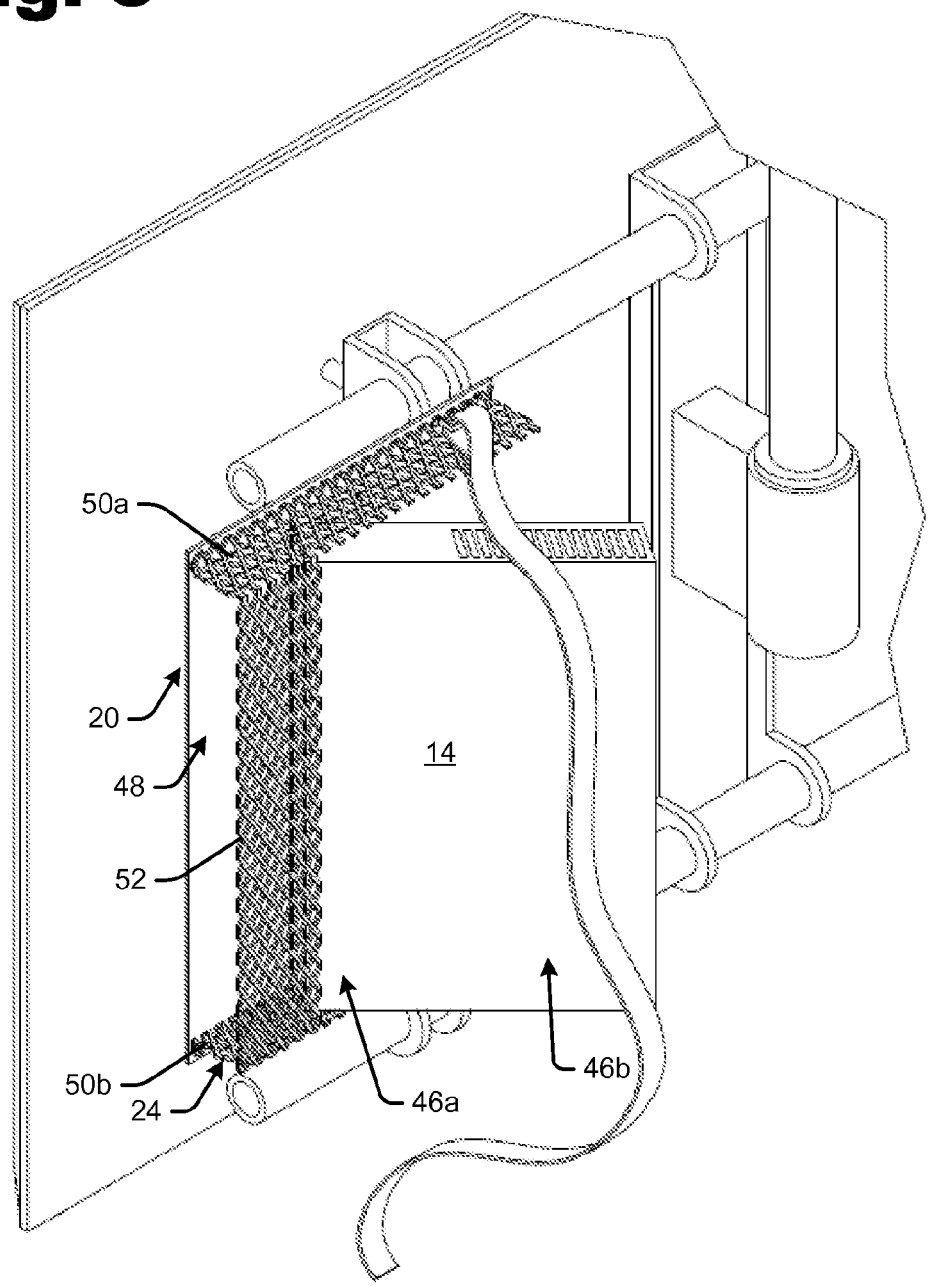
FIG. 5 is a partial magnified view of the example mount system as shown in FIG. 3, with a control box shown being inserted into the control box bracket.

The opposed edge members 50a-b, as shown, are substantially parallel to one another, noting that a typical control box 14 has substantially parallel opposed edges (not labeled). Further, the opposed edge members 50a-b may have a strip width sufficient to accommodate the insertion of a control box 14, as seen in FIGS. 1 and 5, for example.

While the first attachment member 24 is shown having three or more faces, it is noted that a functioning (e.g., sufficiently stiff and strong enough to support a control box 14) first attachment element 24 may also be provided with one edge member attached to the bracket plate 20 (e.g., extended below the control box 14 to provide support against gravity), along with some form of the support member 52. In the latter example, it is noted that the support member 52 may not have to extend fully across the control box 14.

As shown in FIG. 2 (but omitted in the other figures for clarity), a yet additional edge member 54 may be provided, which extends between the opposed edges 46a-b, and orthogonally from the support member 52. The additional edge member 54 may thereby be configured to limit movement of the first box portion 46a of the control box 14 and aid its containment within the first attachment member 24. The opposed edge members 46a-b and the additional edge member 54 may be metallurgically attached (e.g., brazed, welded, or soldered) to the second plate side 40b of the bracket plate 20 as per shown, or, additionally or alternatively, could be otherwise mechanically attached (e.g., riveted, bolted, adhesively mounted, etc.).

The first attachment member 24 may be formed of a unitary sheet of material (as illustrated). In this example, the first attachment member 24 is formed from a sheet of flat expanded metal. The flat expanded metal construction is lightweight, offering little interference with wireless signals (i.e., from a remote), and allows for good airflow to the control box (e.g., promoting cooling). That said, it is noted that the first attachment member 24 may be constructed of other materials (e.g., plastic, non-perforate sheet metal, composite, etc.), does not have to be of a unitary construction, and/or may be formed by another means (e.g., molded to shape). It is considered such a constructed first attachment member 24 is still be within the scope of the present disclosure.

The second attachment element 26 may be in the form of a strap, belt, or other securement. In an example, the second attachment element 26 generally defines a first, attached strap end 56, a second, free strap end 58, and a central, bulk strap portion 60. One of the bracket plate 20 and the first attachment member 24 (e.g., edge member 50a thereof) has a first enclosed strap feed-through member 62. The first strap feed-through member 62 may connectively extend therefrom (as shown), or for example, may be integrally defined within the structure. In turn, the first, attached strap end 56 defines a loop portion 64 operatively fed through and linked with the enclosed strap feed-through member 62.

A second enclosed strap feed-through member 66 may be defined on the control box bracket 18, directly opposed to the first strap feed-through member 62 (schematically indicated in FIG. 6), for example, on one of the bracket plate 20 and the first attachment member 24 (e.g., edge member 50b). Like its counterpart, the second strap feed-through member 62 may connectively extend as shown, or for example, may be integrally defined within the structure. However, unlike where the first strap feed-through member 62 receives the loop portion 64, the second free strap end 58 may be fed through and beyond such that a location within the central, bulk strap portion 60 is confined within the second strap feed-through member 62. This configuration may help to ensure that the second attachment element 26 extends between the opposed edge portions 50a-b.

After having been linked by the first attached strap end 56 to the first strap feed-through member 62 (and possibly fed through second strap feed-through member 62), the second attachment element 26 may be held in place by attaching the second free strap end 58 to the central bulk strap portion 60. In the example illustrated in the figures, this connection may be achieved through a hook-and-loop fastener system (e.g., commercially available as a VELCRO® fastening system). It is noted, however, that other means may also be available for making this connection, such as a belt buckle, button, or snap fit, and such other connector are considered viable alternatives for linking the second free strap end 58 in place relative to the central, bulk strap portion 60.

Figure 6:
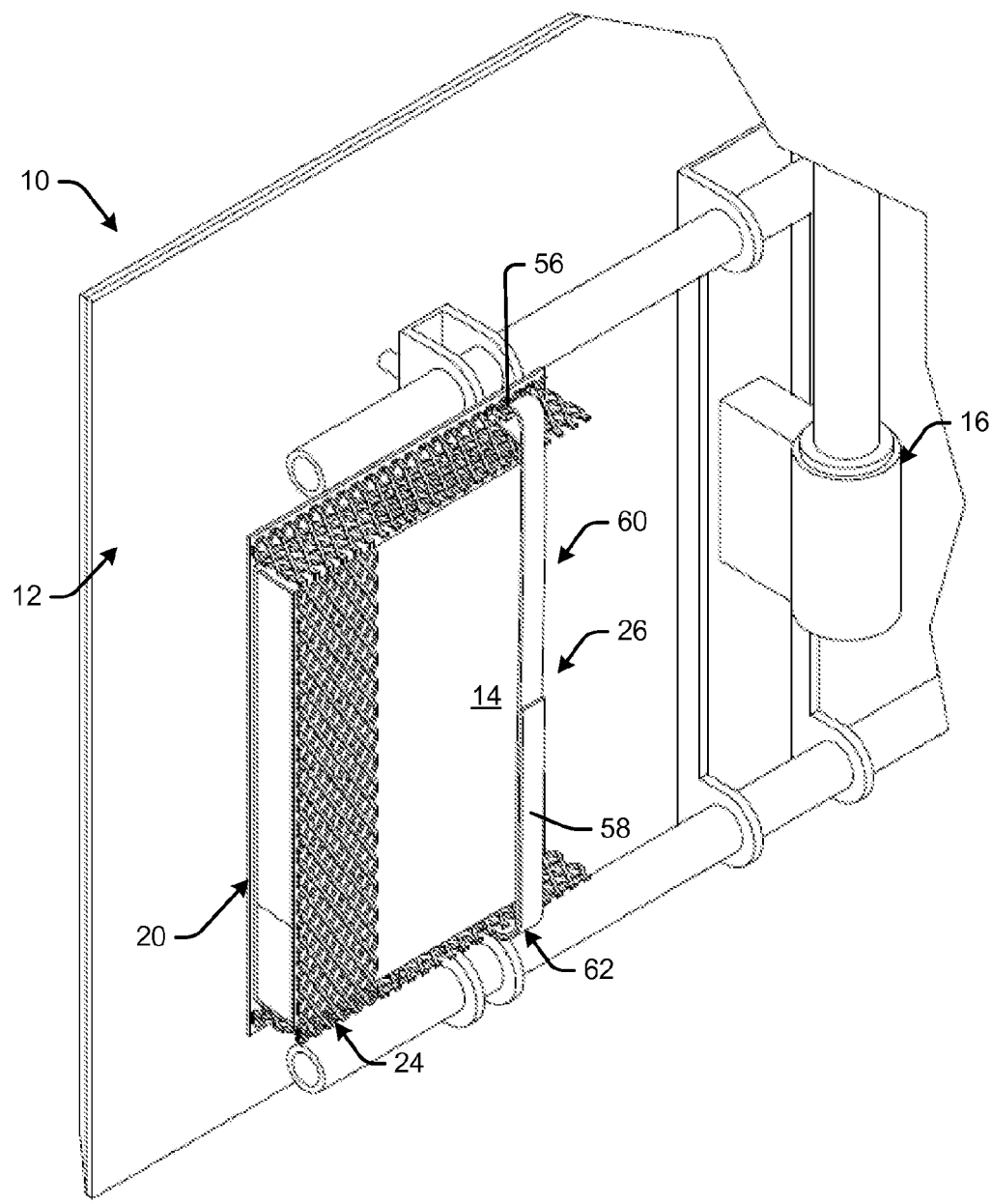
FIG. 6 is a partial magnified view of the example mount system as shown in FIG. 3, with the control box shown in place within the control box bracket.

FIGS. 5 and 6 together illustrate the process of mounting a control box 14 within the example control box bracket 18. In FIG. 5, the first box portion 46a of the control box 14 is shown to be inserted at an angle (not labeled) into the receiving channel 48 defined by the combination of the bracket plate 20 and the first attachment element 24. The initial angle of insertion may be large enough to permit clearance past the central pivot mount 32, but shallow enough to facilitate insertion into the receiving channel 48 (e.g., at an angle of about 15-30 degrees).

When the central pivot mount 32 is cleared, it is then possible to lower the insertion angle to a point where insertion of the first box portion 46*a* into the receiving channel 48 can be completed. Once the first box portion 46*a* of the control box 14 is held in place within the receiving channel 48, the central, bulk strap portion 60 of the second attachment element 26 may be extended across the second box portion 46*a*. The second, free strap end 58 may then be fed through the second strap feed-through member 62, and beyond, so that a location within the central, bulk strap portion 60 is confined within the second strap feed-through member 62. The second free strap end 58 is such that the second attachment element 26 is held sufficiently tight against the control box 14 so as to hold the second box portion 46*b* in place. When sufficiently tight, the free strap end 58 is attached to an appropriate location within the central, bulk strap portion 60.

Figure 7:
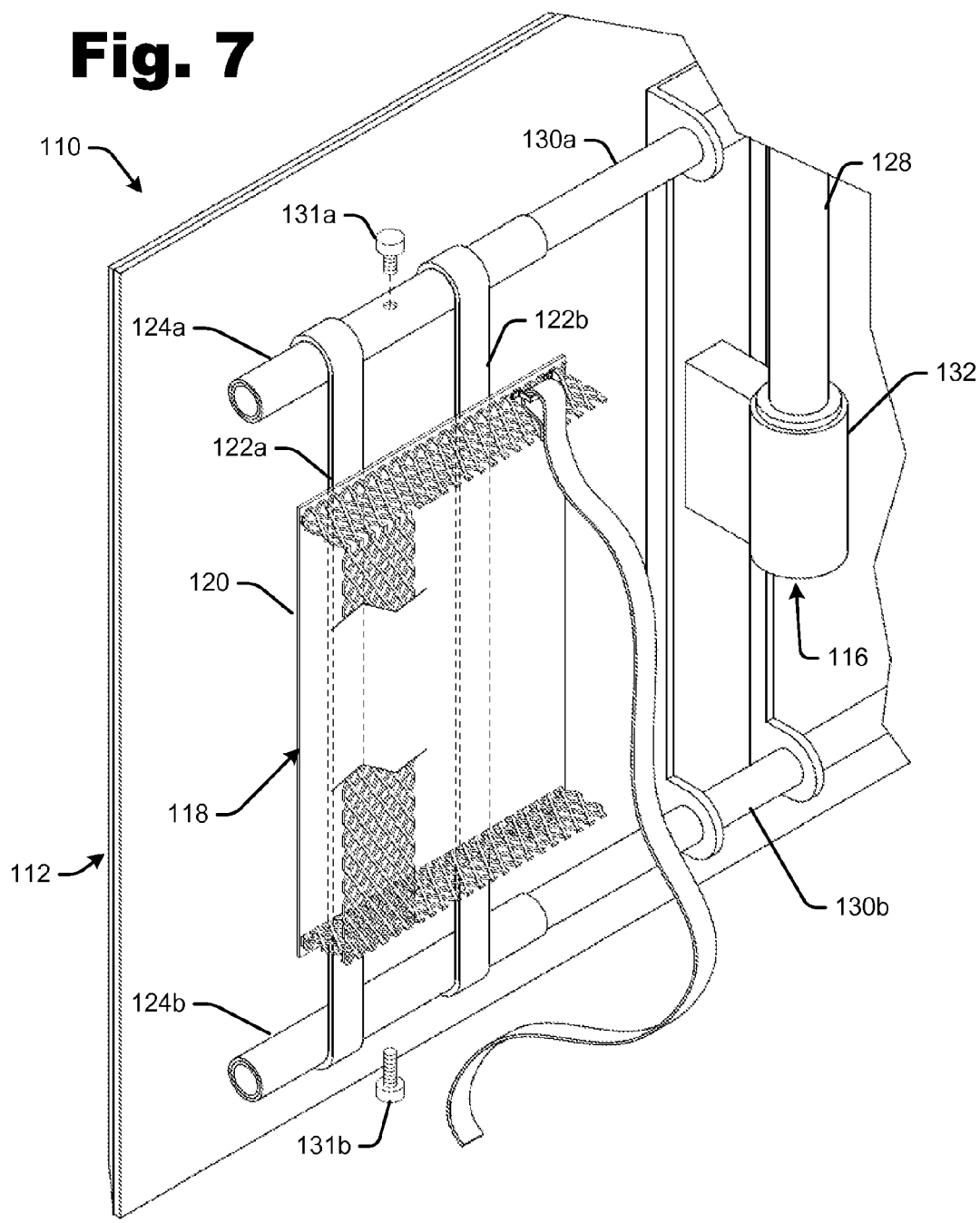
FIG. 7 is a back, partially exploded view of another example mount system as it may be used when mounting a television and a related control box.

FIG. 7 illustrates another example mount system 110. The second example mount system 110 may be used with a television 112, a control box (not shown), a television mount 116, and includes a control box bracket 118. Carrier elements 34*a-b* are not shown in FIG. 7, to simplify the drawing. It is noted that similarly numbered parts (e.g., television 12, 112) are considered similar in function and design, unless otherwise expressly stated. As such, the structure and functionality of such elements are only described further to the degree necessary to highlight the differences between the example mount systems 10, 110.

In this example, the television mount 116 generally includes an extension arm 128, first and second cross bars 130*a-b*, a central pivot mount 132, and carrier elements. The control box bracket 118 includes a bracket plate, at least one bracing element 122 (of which two such elements 122*a* and 122*b* are shown), and attachment elements 124*a-b*.

Differences between the control box brackets 18, 118 lie in the manner of attachment thereof to the first and second cross bars 30*a-b*, 130*a-b*, and in the design of the bracing elements 122*a-b*. For example, the bracing elements 122*a-b* (e.g., configured as "J" structures) hook at a respective hook ends against a respective one of the first and second attachment elements 124*a-b* (e.g., configured as tubes or sleeves) to cross bars 130*a-b*, respectively, and are tightened thereto by respective cross bar fasteners 131*a-b*. For example, a threaded fastener may be used for tightening the tubes 124*a-b* against the corresponding cross bars 130*a-b*.

The bracing elements 122*a-b* may be spot welded or otherwise attached (e.g., using screws) to the bracket plate 120. The bracing elements 122*a-b* may further be spot welded (or otherwise attached) to the tubes 124*a-b*. The tubes 124*a-b* have an inner diameter that is larger than the outer diameter of cross bars 130*a-b* so that the tubes 124*a-b* can be readily slid over the cross bars 130*a-b*, and tightened in place using fasteners 131*a-b*.

Figure 8:
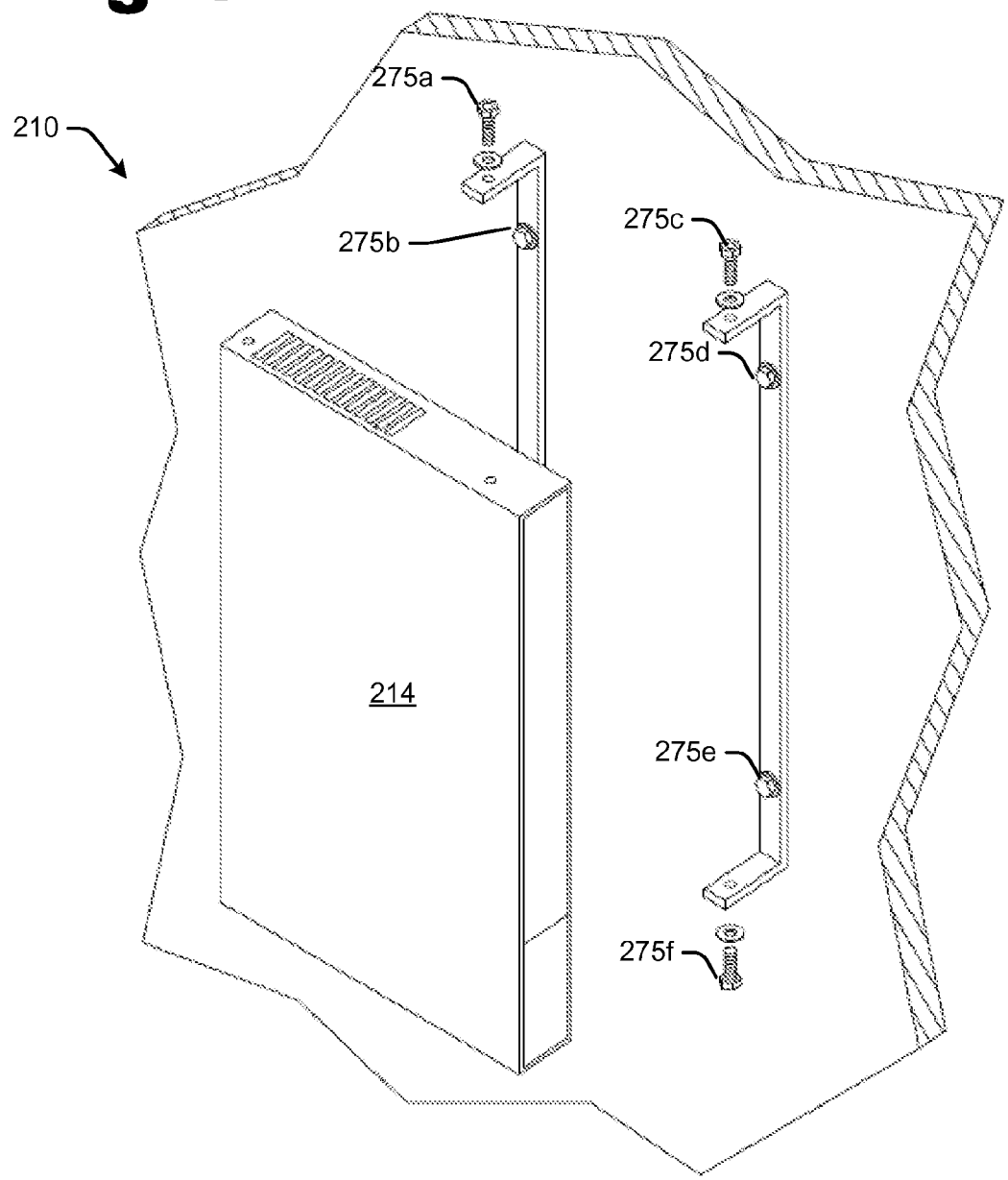
FIG. 8 is a back, partially exploded view of another example mount system as it may be used when mounting a control box relative to a television.

FIG. 8 illustrates another example mount system 210. The example mount system 210 may be used with a television, a control box 214, and includes a control box bracket 218. In the example mount system 210, the control box 214 may be mounted directly to the wall (or other surface, including but not limited to the TV itself).

The control box bracket 218 may include bracing elements 222*a-b* and associated connective hardware 275*a-h* (e.g., as illustrated, bolt and washer combinations, of which a-f are shown), to attach the bracing elements 222*a-b* to the television and to the control box 214.

It should be noted that the examples described above are provided for purposes of illustration, along with methods of implementation thereof, and are not intended to be limiting. Other devices and/or device configurations may be utilized to carry out the operations described herein.

The invention claimed is:

1. A bracket for receiving and mounting a control box to a television mount, the television mount to carry a television, the bracket comprising:
    a bracket plate defining a first plate side and a second plate side;
    at least one bracing element attached to the second plate side of the bracket plate, the at least one bracing element being configured for attachment to the television mount;
    a first attachment element mounted to the first plate side of the bracket plate, the first attachment member and the bracket plate together defining a receiving channel in which to receive a first portion of the control box; and
    a second attachment element comprising a mounting strap, the mounting strap having a first strap end, a second strap end, and a central strap portion, the first strap end being connected at a first connection point to the bracket plate and one of opposed edges of the first attachment element, the second strap end defining a free strap end capable of being attached to the central strap portion, the mounting strap thereby being capable of mounting a second portion of the control box in a fixed position.

2. The bracket of claim 1, further comprising at least one of a threaded fastener and a pin configured to attach the at least one bracing element to the television mount.

3. The bracket of claim 1, wherein the at least one bracing element is a double book, having J-shaped hooks mounted on sleeves to slidably engage television mount cross bars.

4. The bracket of claim 3, wherein the J-shaped hooks are metallically bonded to the bracket plate, and further comprising at least one fastener on each of the sleeves to tighten the sleeves against the television mount cross bars.

5. The bracket of claim 1, wherein the first attachment element defines opposed edges each attached to the bracket plate, and a support member connectively extending between the opposed edges.

6. The bracket of claim 5, Wherein the first attachment element is an unitary member.

7. The bracket of claim 6, wherein the unitary member is formed from a sheet of flat expanded metal.

8. The bracket of claim 5, wherein the first attachment member further defines an additional edge member, the additional edge member extending between the opposed edges and orthogonally from the support member, the additional edge member thereby being configured to limit movement of the first portion of the control box received within the first attachment member.

9. The bracket of claim 1, wherein a second connection point is defined at a location opposite the first connection point, the second connection point located on the bracket plate and the other one of the opposed edges of the first attachment element, the second connection point defining a feed-through position through which the second mounting strap end is fed and is thereby able to be looped back into contact with the central mounting strap portion.

10. The bracket of claim 9, wherein the second mounting strap end and the central mourning strap portion are connected to one another by a hook and loop fastener.

11. The mounted system of claim 1, wherein the first attachment element is an unitary member.

12. The mounted system of claim 11, wherein the unitary member has been bent to define the support member and the opposed edges of the first attachment member.

13. The mounted system of claim 11, wherein the unitary member is formed from a sheet of flat expanded metal.

14. The mounted system of claim 1, wherein a second connection point is defined at a location opposite the first connection point, the second connection point being located on the bracket plate and the other one of the opposed edges of the first attachment element, the second connection point defining a feed-through position through which the second mounting strap end is fed and is thereby able to be looped back into contact with the central mounting strap portion and attached thereto.

15. A mounted system, the system comprising:
a television mount;
a television carried by the television mount;
a control box electrically connected to the television, the control box being configured for controlling an output of the television, the control box including a first box portion and a second box portion;
a bracket receiving and mounting the control box to the television mount, the bracket comprising:
a bracket plate defining a first plate side and a second plate side;
at least one bracing element attached to the second plate side of the bracket plate, the at least one bracing element being attached to the television mount;
a first attachment element mounted to the first plate side of the bracket plate, the first attachment element defining opposed edges each attached to the bracket plate and a support member connectively extending between the opposed edges, the support member and the opposed edges of the first attachment member and the bracket plate together defining a receiving channel in which the first box portion of the control box is received; and
a second attachment element comprising a mounting strap, the mounting strap having a first strap end, a second strap end, and central strap portion, the first strap end being connected at a first connection point to the bracket plate and one of the opposed edges of the first attachment element, the second strap end defining a free strap end being capable of being attached to central strap portion, the mounting strap thereby being capable of mounting the second box portion of the control box in a fixed position relative to the television mount.

16. The mounted system of claim 15, wherein the television mount is a ceiling mount configured for attachment thereof to a ceiling of a room.

17. The mounted system of claim 15, wherein bracket further comprises at least one of a threaded fastener and a linchpin which is used for attaching the at least one bracing element to the television mount.

18. The mounted system of claim 15, wherein the at least one bracing element is at least one of metallically bonded and mechanically fastened to the bracket plate.

19. The mounted system of claim 15, wherein the first attachment element is metallically bonded to the bracket plate.

20. The mounted system of claim 15, wherein the first attachment member further defines an additional edge member, the additional edge member extending between the opposed edges and orthogonally from the support member, the additional edge member thereby being configured to limit movement of the first portion of the control box received within the first attachment member.

* * * * *

UNITED STATES PATENT AND TRADEMARK OFFICE
CERTIFICATE OF CORRECTION

| | |
|---|---|
| PATENT NO. | : 9,113,552 B2 |
| APPLICATION NO. | : 13/804695 |
| DATED | : August 18, 2015 |
| INVENTOR(S) | : Ramon C. T. Martinez |

It is certified that error appears in the above-identified patent and that said Letters Patent is hereby corrected as shown below:

In the claims

Col. 7, lines 1 and 8, the text "of claim 1", each occurrence should read --of claim 15--.

Signed and Sealed this
Fourteenth Day of June, 2016

Michelle K. Lee
*Director of the United States Patent and Trademark Office*